United States Patent
Zhang et al.

(10) Patent No.: US 10,620,727 B2
(45) Date of Patent: Apr. 14, 2020

(54) INFORMATION PROCESSING METHOD AND ELECTRONIC DEVICE

(71) Applicants: Beijing Lenovo Software Ltd., Beijing (CN); Lenovo (Beijing) Co., Ltd., Beijing (CN)

(72) Inventors: Qiang Zhang, Beijing (CN); Tianshu Wang, Beijing (CN); Yan Wang, Beijing (CN); Nannan Yang, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 128 days.

(21) Appl. No.: 14/585,606

(22) Filed: Dec. 30, 2014

(65) Prior Publication Data
US 2016/0026277 A1    Jan. 28, 2016

(30) Foreign Application Priority Data

Jul. 24, 2014 (CN) .......................... 2014 1 0356605
Jul. 24, 2014 (CN) .......................... 2014 1 0357153

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01); *G06F 2203/04104* (2013.01)

(58) Field of Classification Search
CPC ........ G06F 3/041; G06F 3/0412; G06F 3/044; G06F 3/045; G06F 3/0488; G06F 3/04883; G06F 3/04886; G06F 2203/04104

USPC .................... 345/173, 174; 178/18.05, 18.06
See application file for complete search history.

(56) References Cited

U.S. PATENT DOCUMENTS

| 6,118,435 | A | * | 9/2000 | Fujita | .................... | G06F 3/016 |
| | | | | | | 345/173 |
| 8,378,974 | B2 | | 2/2013 | Aroyan et al. | | |
| 8,421,890 | B2 | | 4/2013 | Benkley, III | | |
| 8,791,792 | B2 | | 7/2014 | Benkley, III | | |

(Continued)

FOREIGN PATENT DOCUMENTS

| CN | 101339478 A | 1/2009 |
| CN | 101840294 A | 9/2010 |

(Continued)

OTHER PUBLICATIONS

First Chinese Office Action regarding Application No. 201410356605.4 dated Sep. 30, 2017. English translation provided by Unitalen Attorneys at Law.

*Primary Examiner* — Jimmy H Nguyen
(74) *Attorney, Agent, or Firm* — Harness, Dickey & Pierce, P.L.C.

(57) ABSTRACT

The disclosure provides an information processing method and an electronic device. The method includes: detecting working mode of the touch-control unit; controlling the touch-control unit to work under frequency condition of a first working voltage if it is in a first working mode, and controlling the touch-control unit to work under frequency condition of a second working voltage if it is in a second working mode. Frequency of the first working voltage is a fixed and frequency of the second working voltage is time-varying. A corresponding electronic device is also disclosed.

12 Claims, 11 Drawing Sheets

(56) References Cited

U.S. PATENT DOCUMENTS

| | | | |
|---|---|---|---|
| 8,810,546 B1 * | 8/2014 | Kremin | G06F 3/0416 345/174 |
| 8,866,347 B2 | 10/2014 | Benkley, III | |
| 8,866,792 B2 | 10/2014 | Wang et al. | |
| 9,268,988 B2 | 2/2016 | Benkley, III | |
| 9,600,704 B2 | 3/2017 | Benkley, III | |
| 9,659,208 B2 | 5/2017 | Benkley, III | |
| 2009/0008160 A1 | 1/2009 | Aroyan et al. | |
| 2009/0225036 A1 * | 9/2009 | Wright | G06F 3/0416 345/173 |
| 2011/0175703 A1 | 7/2011 | Benkley, III | |
| 2011/0175847 A1 | 7/2011 | Wang et al. | |
| 2011/0176037 A1 | 7/2011 | Benkley, III | |
| 2012/0134549 A1 | 5/2012 | Benkley, III | |
| 2012/0169660 A1 * | 7/2012 | Seo | G06F 1/3262 345/174 |
| 2013/0009651 A1 | 1/2013 | Benkley, III | |
| 2013/0120053 A1 * | 5/2013 | Mei | G06F 3/0418 327/517 |
| 2013/0176272 A1 * | 7/2013 | Cattivelli | G06F 3/041 345/174 |
| 2013/0193988 A1 | 8/2013 | Benkley, III | |
| 2015/0138130 A1 * | 5/2015 | Murphy | G06F 3/0416 345/174 |
| 2015/0177874 A1 * | 6/2015 | Kwon, II | G06F 3/044 345/174 |
| 2016/0018867 A1 * | 1/2016 | Nys | G01R 27/2605 324/674 |
| 2016/0154988 A1 | 6/2016 | Benkley, III | |
| 2017/0228574 A1 | 8/2017 | Benkley, III | |

FOREIGN PATENT DOCUMENTS

| | | |
|---|---|---|
| CN | 102893248 A | 1/2013 |
| CN | 203520304 U | 4/2014 |

* cited by examiner

INFORMATION PROCESSING METHOD AND ELECTRONIC DEVICE

The present application claims the priority of Chinese Patent Application No. 201410357153.1, entitled as "Information processing method and electronic device", and filed with the Chinese Patent Office on Jul. 24, 2014, and Chinese Patent Application No. 201410356605.4, entitled as "Information processing method and electronic device", and filed with the Chinese Patent Office on Jul. 24, 2014, the contents of which are incorporated herein by reference in its entirety.

FIELD

The present disclosure relates to the field of information processing technique, and in particular to an information processing method and an electronic device.

BACKGROUND

Touch screen is applied in more and more devices. For example, a touch screen is integrated in the display of a mobile phone, a tablet computer such as an iPad, an all-in-one machine even a desktop computer. These electronic devices may position a touch point accurately with the touch screen. However, as the diversification development of the electronic devices and interactive modes, it is desired that the touch screen may not only position the touch point accurately, but also identify touch by different users. At present, it is needed to provide more effective approach for identifying user-identity by touch.

SUMMARY

The embodiments of present disclosure provide an information processing method and an electronic device.

An information processing method, the method comprises:

detecting working mode of a touch-control unit, wherein the touch-control unit comprises N touch-control nodes, N≥2;

controlling the touch-control unit to work under frequency condition of a first working voltage if the touch-control unit is in a first working mode, wherein the frequency condition of the first working voltage is that frequency of the first working voltage is a fixed value;

controlling the touch-control unit to work under frequency condition of a second working voltage if the touch-control unit is in a second working mode, wherein the frequency condition of the second working voltage is that frequency of the second working voltage is time-varying within a preset threshold range.

Preferably, if the touch-control unit is in the first working mode, the method further comprises:

detecting a first touch operation associated with the touch-control unit;

acquiring first attribute information of the first touch operation; and determining a touch region corresponding to the first touch operation according to the first attribute information.

Preferably, if the touch-control unit is in the second working mode, the method further comprising:

detecting a second touch operation associated with the touch-control unit, wherein the first and second touch operations are touch operations on the touch-control unit at different times;

acquiring variations of a first attribute value of a touch-control node within a touch region corresponding to the second touch operation under different frequencies of the second working voltage; and generating first physiological characteristic information based on the variations of the first attribute value of a touch-control node within a touch region corresponding to the second touch operation under different frequencies of the second working voltage.

An electronic device, the device comprises:

a touch-control unit comprising N touch-control nodes, wherein N≥2;

a determining unit configured to determine working mode of the touch-control unit; and a control unit configured to control frequency condition of a working voltage for the touch-control unit by:

controlling the touch-control unit to work under frequency condition of a first working voltage if the touch-control unit is in a first working mode, wherein the frequency condition of the first working voltage is that frequency of the first working voltage is a fixed value;

controlling the touch-control unit to work under frequency condition of a second working voltage if the touch-control unit is in a second working mode, wherein the frequency condition of the second working voltage is that frequency of the second working voltage is time-varying within a preset threshold range.

Preferably, the electronic device further comprises:

a first detection unit is configured to detect a first touch operation associated with the touch-control unit, if the touch-control unit is in the first working mode;

a first acquisition unit is configured to acquire first attribute information of the first touch operation and determine a touch region corresponding to the first touch operation based on the first attribute information.

Preferably, the electronic device further comprises:

a second detection unit is configured to detect a second touch operation associated with the touch-control, if the touch-control unit is in the second working mode; wherein the first and second touch operations are touch operations on the touch-control unit at different times;

a second acquisition unit is configured to acquire variations of a first attribute value of a touch-control node within a touch region corresponding to the second touch operation on the touch-control unit under different frequencies of the second working voltage; and a generating unit is configured to generate first physiological characteristic information based on the variations of the first attribute value of the touch-control node within the touch region corresponding to the second touch operation on the touch-control unit under the different frequencies of the second working voltage.

DETAILED DESCRIPTION OF THE EMBODIMENTS

In the following, the present disclosure will be described in further detail with embodiments and in conjunction with the appended drawings, so that the object, technical scheme and advantages of the present disclosure become more clear and understanding.

Figure 1:
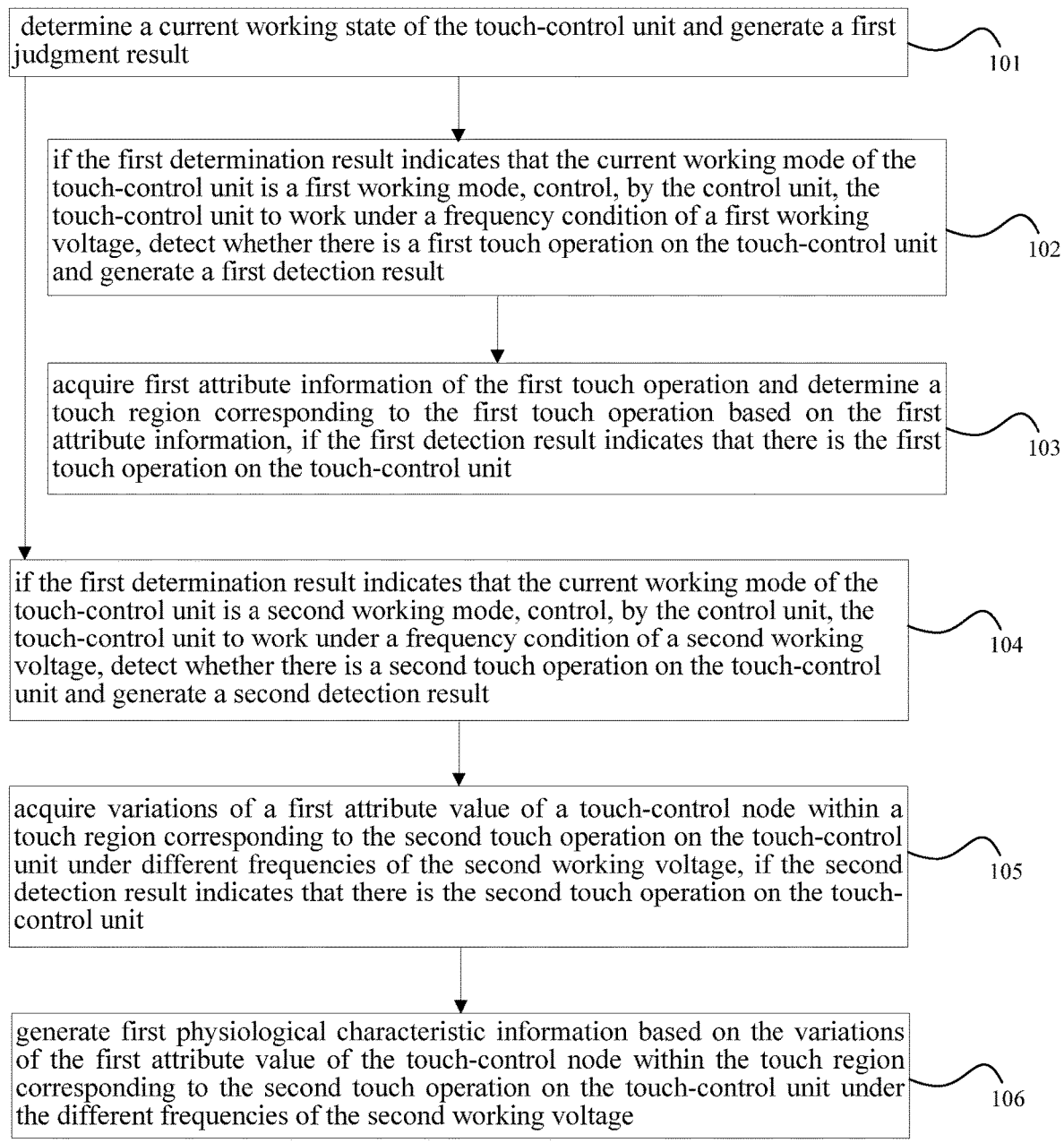
FIG. 1 is a flowchart of an information processing method according to a first embodiment of the present disclosure.

FIG. 1 is a flowchart of an information processing method according to a first embodiment of the present disclosure. As shown in FIG. 1, the information processing method according to the embodiment is applied in an electronic device. The electronic device includes a touch-control unit capable of identifying first attribute information of a touch operation and a control unit for controlling the frequency of a working voltage of the touch-control unit; wherein the touch-control unit includes N touch-control nodes, where N≥2, the first attribute information of the touch operation represents a variation of a first attribute value of a touch-control node within a touch region corresponding to the touch operation on the touch-control unit. The electronic device according to the embodiment of the present disclosure includes, but is not limited to, a mobile phone, a computer, a tablet computer, an electronic reader, a personal digital assistant, etc, as long as the electronic device includes a touch screen and a user can touch-control the electronic device with the touch screen. In the embodiment of the present disclosure, the touch-control unit is a touch screen and in general is a capacitive touch screen. The information processing method according to the embodiment includes steps as follows.

In step 101, a current working state of the touch-control unit is determined and a first determination result is generated.

In the embodiment of the present disclosure, if it is determined that the touch-control unit of the electronic device is in a non-identifying user-identity working mode, the control unit controls a correlated circuit to provide a touch-control node of the touch-control unit with a non-frequency-variable voltage. Correspondingly, in the case that the touch-control unit of the electronic device is in an identifying user-identity state, the control unit controls the correlated circuit to provide the touch-control node of the touch-control unit with a gradual frequency-changing voltage to detect variations of a capacitance value of the same touch-control node within a touch region corresponding to a touch operation under different frequencies.

In step 102, if the first determination result indicates that the current working mode of the touch-control unit is a first working mode, the control unit controls the touch-control unit to work under a frequency condition of a first working voltage, and it is detected whether there is a first touch operation on the touch-control unit and a first detection result is generated.

Specifically, the frequency condition of the first working voltage is that the frequency of the first working voltage is a flexed value.

In the embodiment of the present disclosure, the first working mode is that the touch-control unit is in the non-identifying user-identity working state, that is, the touch-control unit is in a working mode in which a region corresponding to a touch operation of the user is identified, so that the touch-control unit of the electronic device is in a normal working mode in which a touch location is identified.

In step 103, first attribute information of the first touch operation is acquired and a touch region corresponding to the first touch operation is determined based on the first attribute information, if the first detection result indicates that there is the first touch operation on the touch-control unit.

When the touch-control unit such as the touch screen is touched by the user, the capacitance of a touch-control node within the region corresponding to the touch operation will change, and the control unit of the electronic device determines location information of the touch of the user on the touch-control unit by detecting the capacitance of the touch-control node. The first attribute information is a variation of a first attribute value of a touch-control node within a touch region corresponding to a touch operation on the touch-control unit. And the first attribute value is a capacitance value of the touch-control node.

In step 104, if the first determination result indicates that the current working mode of the touch-control unit is a second working mode, the control unit controls the touch-control unit to work under a frequency condition of a second working voltage, and it is detected whether there is a second touch operation on the touch-control unit and a second detection result is generated.

Specifically, the frequency condition of the second working voltage is that the frequency of the second working voltage is time-varying within a set threshold range with time, and the first and second touch operations are touch operations on the touch-control unit at different times.

In the embodiment of the present disclosure, the second working mode is that the touch-control unit of the electronic device is in an identifying user-identity working state. In this working mode, a gradual frequency-changing voltage needs to be applied to the touch-control unit of the electronic device, variations of a capacitance value of a touch-control node within a region corresponding to a touch operation under different frequencies is determined as an identification of a user performing the touch operation. It should be noted that, when each user touches the touch-control unit under the same condition, the variation of the capacitance value of the touch-control node within the region corresponding to the touch operation is different. When under the voltage with different frequencies, the variations of the capacitance value of the touch-control node within the region corresponding to the touch operation by the same user are also different. The variations of the capacitance value of the touch-control node within the region corresponding to the touch operation of the user under different frequencies may be considered as the identification of the user. At least, within a set time period, the electrical property of the user himself changes sharply, so that both the different frequencies and the variations of the capacitance value of the touch-control node within the region corresponding to the touch operation under different frequencies may be considered as the identification information of the user.

In step 105, it is acquired variations of a first attribute value of a touch-control node within a touch region corresponding to the second touch operation on the touch-control unit under different frequencies of the second working voltage, if the second detection result indicates that there is the second touch operation on the touch-control unit.

In the embodiment of the present disclosure, if it is determined that the touch-control unit of the electronic device is switched to the second working mode, it will be detected the variations of the capacitance value of the touch-control node within the region corresponding to the touch operation on the touch-control unit performed by the user under different frequencies. In the embodiment of the present disclosure, the first and second touch operations are only the touch operations on the touch-control unit of the electronic device performed by the user at different times, may be located in the same region or different regions of the touch-control unit, or may be different touch operations on the touch-control unit performed by the same user.

In step 106, first physiological characteristic information is generated based on the variations of the first attribute value of the touch-control node within the touch region corresponding to the second touch operation on the touch-control unit under the different frequencies of the second working voltage.

In the embodiment of the present disclosure, after it is determined the variation of the capacitance value of the touch-control node within the touch region corresponding to the touch operation under a voltage with different frequencies, a correspondence between the different frequencies and the variations of the capacitance value of the touch-control node within the touch region corresponding to the touch operation is considered as the physiological characteristic information of the user to identify the identity of the user.

Figure 2:
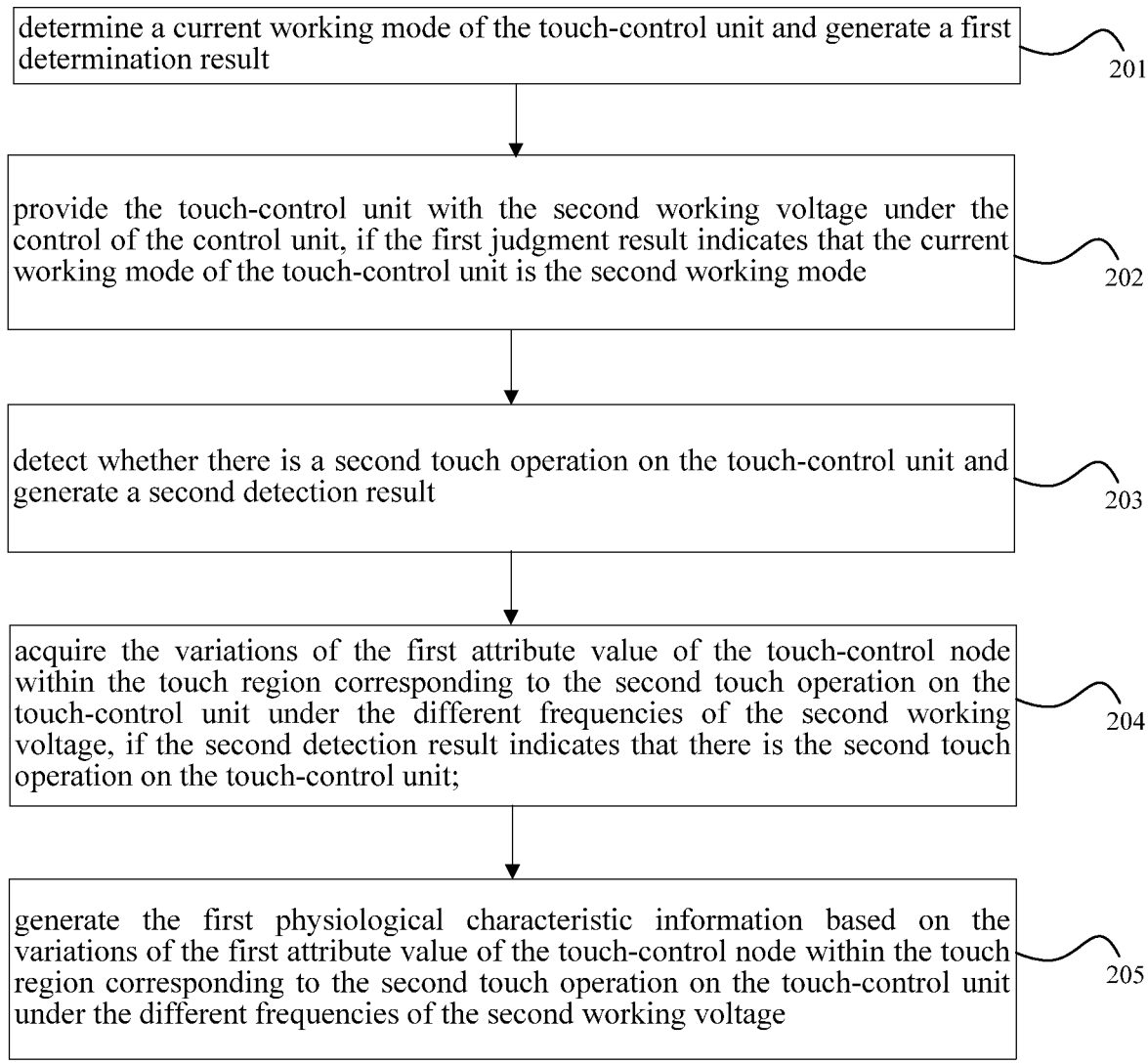
FIG. 2 is a flowchart of an information processing method according to a second embodiment of the present disclosure.

FIG. 2 is a flowchart of an information processing method according to a second embodiment of the present disclosure. As shown in FIG. 2, the information processing method in the example is applied in an electronic device. The electronic device includes a touch-control unit capable of identifying first attribute information of a touch operation and a control unit for controlling the frequency of a working voltage of the touch-control unit; wherein the touch-control unit includes N touch-control nodes, where N≥2, the first attribute information of the touch operation represents a variation of a first attribute value of a touch-control node within a touch region corresponding to the touch operation on the touch-control unit. The electronic device according to the embodiment of the present disclosure includes, but is not limited to, a mobile phone, a computer, a tablet computer, an electronic reader, a personal digital assistant, etc, as long as the electronic device includes a touch screen and a user can touch-control the electronic device with the touch screen. In the embodiment of the present disclosure, the touch-control unit is a touch screen and in general is a capacitive touch screen.

In the embodiment of the present disclosure, the touch-control unit includes P row electrodes and M column electrodes and the P row electrodes are intersected with the M column electrodes to form the N touch-control nodes, where P≥2 and M≥2.

The information processing method in the example includes steps as follows.

In step 201, a current working mode of the touch-control unit is determined and a first determination result is generated.

In the embodiment of the present disclosure, if it is determined that the touch-control unit of the electronic device is in a non-identifying user-identity working mode, the control unit controls a correlated circuit to provide a touch-control node of the touch-control unit with a non-frequency-variable voltage. Correspondingly, in the case that the touch-control unit of the electronic device is in an identifying user-identity state, the control unit controls the correlated circuit to provide the touch-control node of the touch-control unit with a gradual frequency-changing voltage to detect variations of a capacitance value of a corresponding touch-control node within a touch region corresponding to the touch operation under different frequencies.

In step 202, the touch-control unit is provided with the second working voltage under the control of the control unit, if the first determination result indicates that the current working mode of the touch-control unit is the second working mode.

In the embodiment of the present disclosure, the frequency of the second working voltage is time-varying within the set threshold range and the second working voltage provides the P row electrodes and the M column electrodes with a working voltage in parallel. Under the second working mode, the working voltage is provided to all the P row electrodes and the M column electrodes of the touch-control unit in parallel, in this case, a variation of a capacitance value of a touch-control node within a region corresponding to a touch operation may be detected under a changing frequency of the second working voltage wherever the user performs the touch operation on the touch-control unit, and thereby the physiological characteristic information of the user is determined.

The first and second touch operations are touch operations performed on the touch-control unit at different times.

In the embodiment of the present disclosure, the second working mode is that the touch-control unit of the electronic device is in an identifying user-identity working state. In this working mode, a gradual frequency-changing voltage needs to be applied to the touch-control unit of the electronic device, variations of a capacitance value of a touch-control node within a region corresponding to a touch operation under different frequencies is determined as an identification of a user performing the touch operation. It should be noted that, when each user touches the touch-control unit under the same condition, the variation of the capacitance value of the touch-control node within the region corresponding to the touch operation is different. When under the voltage with different frequencies, the variations of the capacitance value of the touch-control node within the region corresponding to the touch operation of the same user are also different. The variations of the capacitance value of the touch-control node within the region corresponding to the touch operation of the user under different frequencies may be considered as the identification of the user. At least, within a set time period, the electrical property of the user himself changes sharply, so that both the different frequencies and the variations of the capacitance value of the touch-control node within the region corresponding to the touch operation under different frequencies may be considered as the identification information of the user.

In step 203, it is detected whether there is a second touch operation on the touch-control unit and a second detection result is generated.

Specifically, whether there is the second touch operation on the touch-control unit may be determined by detecting whether the capacitance of the touch-control node on the touch-control unit changes.

In step 204, it is acquired the variations of the first attribute value of the touch-control node within the touch region corresponding to the second touch operation on the touch-control unit under the different frequencies of the second working voltage, if the second detection result indicates that there is the second touch operation on the touch-control unit.

Specifically, a variation of a capacitance value of a touch-control node within a region corresponding to a touch operation under each frequency is detected by changing the frequency of the second working voltage.

In step 205, the first physiological characteristic information is generated based on the variations of the first attribute value of the touch-control node within the touch region corresponding to the second touch operation on the touch-control unit under the different frequencies of the second working voltage.

In the embodiment of the present disclosure, after it is determined the variations of the capacitance value of the touch-control node within the touch region corresponding to the touch operation under a voltage with different frequencies, a correspondence between the different frequencies and the variations of the capacitance value of the touch-control node within the touch region corresponding to the touch operation is considered as the physiological characteristic information of the user to identify the identity of the user.

Figure 3:
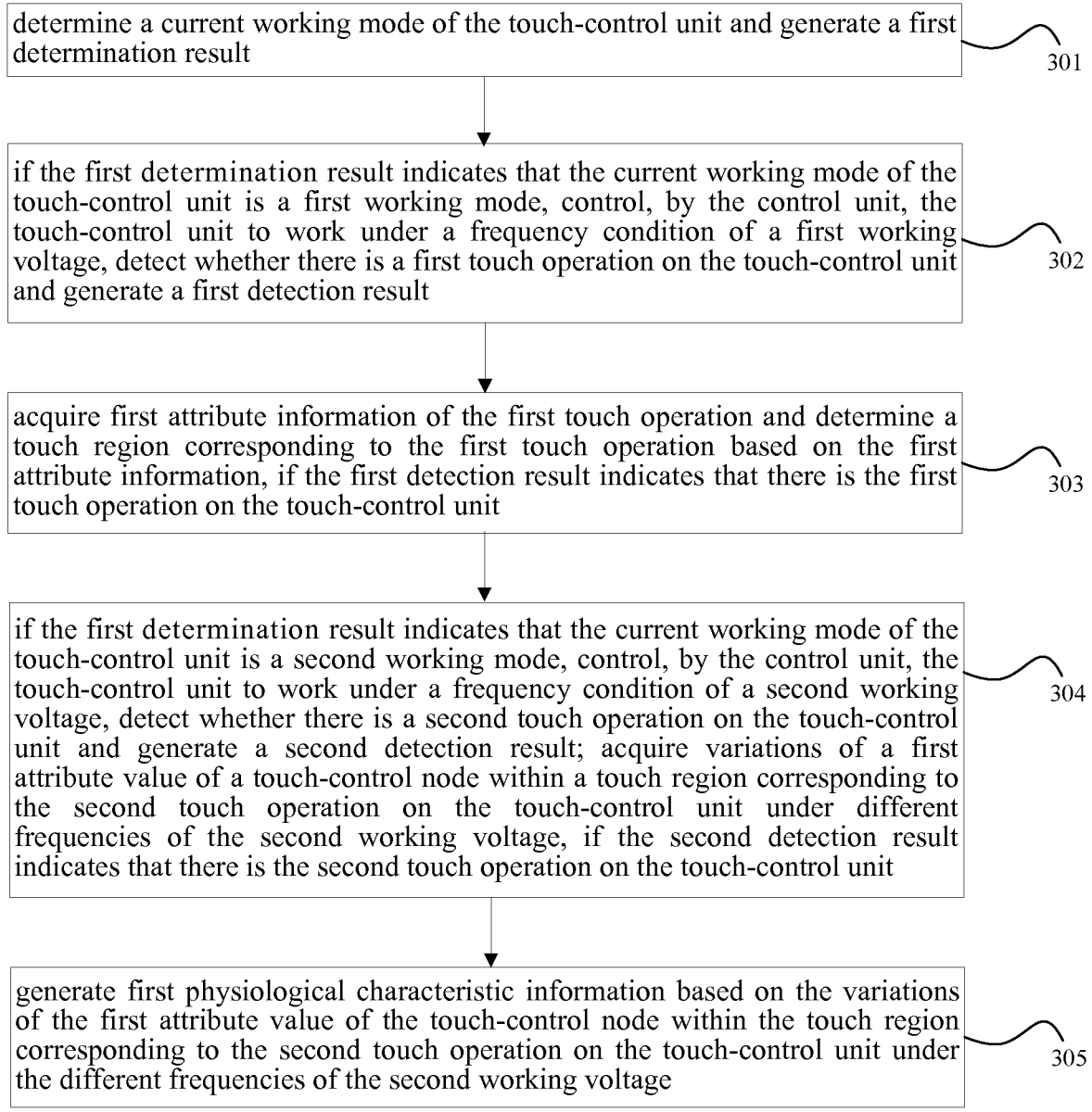
FIG. 3 is a flowchart of an information processing method according to a third embodiment of the present disclosure.

FIG. 3 is a flowchart of an information processing method according to a third embodiment of the present disclosure. As shown in FIG. 3, the information processing method in the example is applied in an electronic device. The electronic device includes a touch-control unit capable of identifying first attribute information of a touch operation and a control unit for controlling the frequency of a working voltage of the touch-control unit; wherein the touch-control unit includes N touch-control nodes, where N≥2, the first attribute information of the touch operation represents a variation of a first attribute value of a touch-control node within a touch region corresponding to the touch operation on the touch-control unit. The electronic device according to the embodiment of the present disclosure includes, but is not limited to, a mobile phone, a computer, a tablet computer, an electronic reader, a personal digital assistant, etc, as long as the electronic device includes a touch screen and a user can touch-control the electronic device with the touch screen. In the embodiment of the present disclosure, the touch-control unit is a touch screen and in general is a capacitive touch screen.

In the embodiment of the present disclosure, the touch-control unit includes P row electrodes and M column electrodes and the P row electrodes are intersected with the M column electrodes to form the N touch-control nodes, where P≥2 and M≥2.

The information processing method in the example includes steps as follows.

In step 301, a current working mode of the touch-control unit is determined and a first determination result is generated.

In the embodiment of the present disclosure, if it is determined that the touch-control unit of the electronic device is in a non-identifying user-identity working mode, the control unit controls a correlated circuit to provide a touch-control node of the touch-control unit with a non-frequency-variable voltage. Correspondingly, in the case that the touch-control unit of the electronic device is in an identifying user-identity state, the control unit controls the correlated circuit to provide the touch-control node of the touch-control unit with a gradual frequency-changing voltage to detect variations of a capacitance value of the same touch-control node within a touch region corresponding to the touch operation under different frequencies.

In step 302, if the first determination result indicates that the current working mode of the touch-control unit is a first working mode, the control unit controls the touch-control unit to work under a frequency condition of a first working voltage, and it is detected whether there is a first touch operation on the touch-control unit and a first detection result is generated.

Specifically, the frequency condition of the first working voltage is that the frequency of the first working voltage is a flexed value.

In the embodiment of the present disclosure, the first working mode is that the touch-control unit is in the non-identifying user-identity working state, that is, the touch-control unit is in a working mode in which a region corresponding to a touch operation of the user is identified, so that the touch-control unit of the electronic device is in a normal working mode in which a touch location is identified.

In step 303, first attribute information of the first touch operation is acquired and a touch region corresponding to the first touch operation is determined based on the first attribute information, if the first detection result indicates that there is the first touch operation on the touch-control unit.

When the touch-control unit such as the touch screen is touched by the user, the capacitance of a touch-control node within a region corresponding to the touch operation may change, and the control unit of the electronic device determines location information of the touch of the user on the touch-control unit by detecting the capacitance of the touch-control node. The first attribute information is a variation of the first attribute value of the touch-control node within the touch region corresponding to the touch operation on the touch-control unit. And the first attribute value is a capacitance value of the touch-control node.

In step 304, if the first determination result indicates that the current working mode of the touch-control unit is a second working mode, the control unit controls the touch-control unit to work under a frequency condition of a second working voltage, it is detected whether there is a second touch operation on the touch-control unit and a second detection result is generated. And it is acquired variations of a first attribute value of a touch-control node within a touch region corresponding to the second touch operation on the touch-control unit under different frequencies of the second working voltage, if the second detection result indicates that there is the second touch operation on the touch-control unit.

Specifically, the frequency condition of the second working voltage is that the frequency of the second working voltage is time-varying within a set threshold range.

In the embodiment of the present disclosure, the second working mode is that the touch-control unit of the electronic device is in an identifying user-identity working state. Under this working mode, a gradual frequency-changing voltage needs to be applied to the touch-control unit of the electronic device, variations of a capacitance value of a touch-control node within a region corresponding to a touch operation under different frequencies is determined as an identification of a user performing the touch operation.

The touch region corresponding to the first touch operation is set as the touch region corresponding to the second touch operation. And a row electrode and a column electrode which pass through the touch region corresponding to the second touch operation are determined.

A second working voltage is provided in parallel to the row electrode and the column electrode, which pass through the touch region corresponding to the second touch operation, under the control of the control unit. The frequency of the second working voltage is time-varying within a set threshold range.

It should be noted that, when each user touches the touch-control unit under the same condition, the variation of the capacitance value of the touch-control node within the region corresponding to the touch operation is different. When under the voltage with different frequencies, the variations of the capacitance value of the touch-control node within the region corresponding to the touch operation of the same user are also different. The variations of the capacitance value of the touch-control node within the region corresponding to the touch operation of the user under different frequencies may be considered as the identification of the user. At least, within a set time period, the electrical property of the user himself changes sharply, so that both the different frequencies and the variations of the capacitance value of the touch-control node within the region corresponding to the touch operation under different frequencies may be considered as the identification information of the user.

In step 305, first physiological characteristic information is generated based on the variations of the first attribute value of the touch-control node within the touch region corresponding to the second touch operation on the touch-control unit under the different frequencies of the second working voltage.

In the embodiment of the present disclosure, after it is determined the variations of capacitance value of the touch-control node within the touch region corresponding to the touch operation under a voltage with different frequencies, a correspondence between the different frequencies and the variations of the capacitance value of the touch-control node within the touch region corresponding to the touch operation may be considered as the physiological characteristic information of the user to identify the identity of the user.

It should be noted that, in the above embodiments, the touch-control unit includes P row electrodes and M column electrodes, where P≥2 and M≥2. The first and second working voltages provide the P row electrodes and the M column electrodes with the first and second working voltages by scanning the P row electrodes and the M column electrodes row by row.

Figure 4:
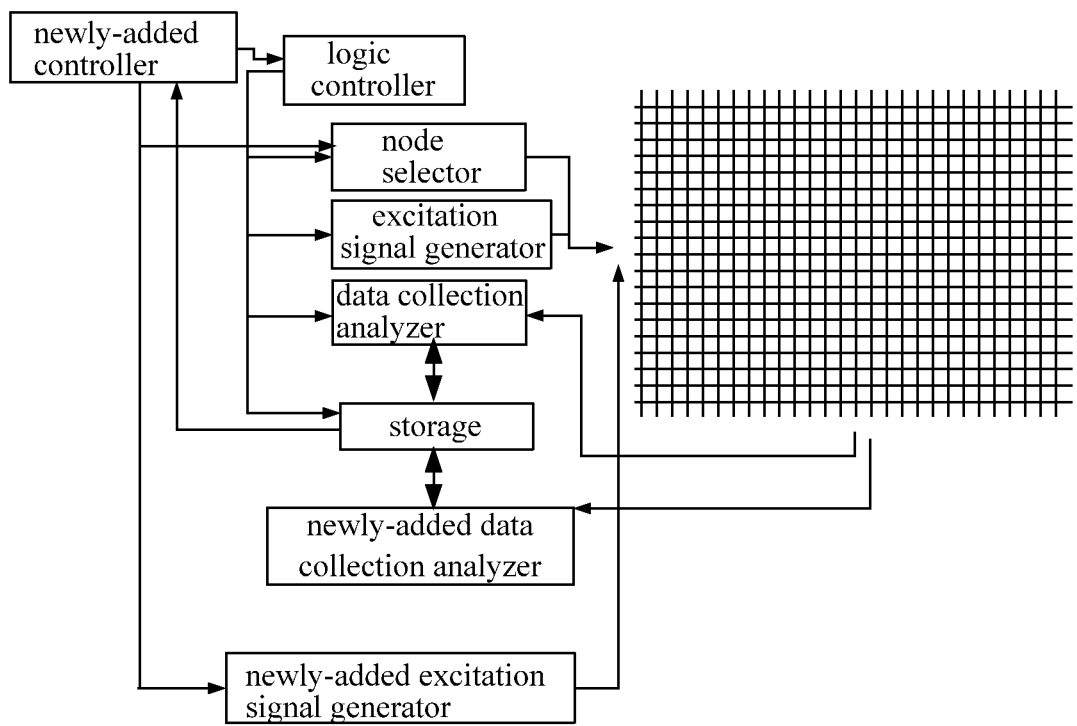
FIG. 4 is a structural diagram of the control logic of a touch-control unit according to an embodiment of the present disclosure.

FIG. 4 is a structural diagram of the control logic of a touch-control unit according to an embodiment of the present disclosure. As shown in FIG. 4, a logic controller, a node selector, an excitation signal generator, a data collection analyzer and a storage are all hardware control units for rendering a touch-control unit be in a first working mode. The logic controller performs an overall control on the node selector, the excitation signal generator, the data collection analyzer and the storage. On the right side of the figure, there are row electrodes and column electrodes of the touch-control unit and a touch-control node is formed at an intersecting point of the row electrodes and the column electrodes. The node selector selects a row electrode and a column electrode of the touch-control unit. For example, the row electrodes and the column electrodes of the touch-control unit may be provided with a working voltage in a scanning manner. The excitation signal generator is for providing the row electrodes and the column electrodes with the working voltage. Specifically, the excitation signal generator cooperates with the node selector to provide the row electrodes and the column electrodes with an excitation voltage in the scanning manner. The data collection analyzer identifies a touch operation of a user and determines a touch-control node with a changing capacitance by data analyzing, hence identifies a region corresponding to the touch operation of the user. The storage is for storing data after the data is processed by the data collection analyzer.

In order to make the embodiment of the present disclosure support a second working mode, the embodiment of the present disclosure adds a newly-added controller, a newly-added data collection analyzer and a newly-added excitation signal generator to a logic control circuit of the touch-control unit. Specifically, the newly-added controller is for controlling the logic controller to disable the excitation signal generator and enable the newly-added excitation signal generator and the node selector, to provide the row electrodes and the column electrodes of the touch-control unit with the excitation voltage, when the second working mode is started. In the embodiment of the present disclosure, the newly-added excitation signal generator can generate a voltage with a gradually changing frequency.

Figure 5:
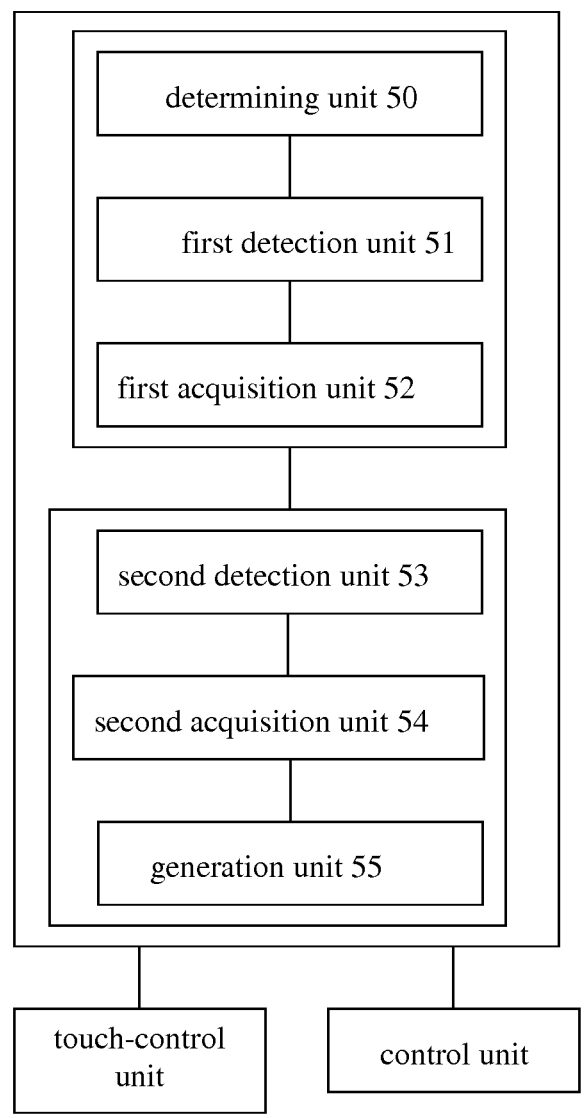
FIG. 5 is a schematic structural diagram of the composition of an electronic device according to a fourth embodiment of the present disclosure.

FIG. 5 is a schematic structural diagram of the composition of an electronic device according to a fourth embodiment of the present disclosure. As shown in FIG. 5, the electronic device includes a touch-control unit capable of identifying first attribute information of a touch operation and a control unit for controlling the frequency of a working voltage of the touch-control unit, the touch-control unit includes N touch-control nodes, where N≥2, the first attribute information of the touch operation represents a variation of a first attribute value of a touch-control node within a touch region corresponding to the touch operation on the touch-control unit; the electronic device further includes a determining unit 50, a first detection unit 51, a first acquisition unit 52, a second detection unit 53, a second acquisition unit 54 and a generation unit 55; wherein the determining unit 50 is configured to determine a current working mode of the touch-control unit and generate a first determination result;

if the first determination result indicates that the current working mode of the touch-control unit is a first working mode, the control unit controls the touch-control unit to work under a frequency condition of a first working voltage and the first detection unit 51 is configured to detect whether there is a first touch operation on the touch-control unit and generate a first detection result; wherein the frequency condition of the first working voltage is that the frequency of the first working voltage is a fixed value;

the first acquisition unit 52 is configured to acquire first attribute information of the first touch operation and determine a touch region corresponding to the first touch operation based on the first attribute information, if the first detection result indicates that there is the first touch operation on the touch-control unit;

if the first determination result indicates that the current working mode of the touch-control unit is a second working mode, the control unit controls the touch-control unit to work under a frequency condition of a second working voltage and the second detection unit 53 is configured to detect whether there is a second touch operation on the touch-control unit and generate a second detection result; wherein the frequency condition of the second working voltage is that the frequency of the second working voltage is time-varying within a set threshold range, and the first and second touch operations are touch operations on the touch-control unit at different times;

the second acquisition unit 54 is configured to acquire variations of a first attribute value of a touch-control node within a touch region corresponding to the second touch operation on the touch-control unit under different frequencies of the second working voltage, if the second detection result indicates that there is the second touch operation on the touch-control unit; and the generation unit 55 is configured to generate first physiological characteristic information based on the variations of the first attribute value of the touch-control node within the touch region corresponding to the second touch operation on the touch-control unit under the different frequencies of the second working voltage The variation of the first attribute value of the touch-control node is a variation of a capacitance value of the touch-control node; and the first physiological characteristic information is a correspondence between different frequencies of the working voltage and the variations of the capacitance value of the touch-control node within the touch region corresponding to the touch operation under the different frequencies for an electronic device user.

As an implementation, the touch-control unit includes P row electrodes and M column electrodes, where P≥2 and M≥2;

the first and second working voltages in the aforementioned embodiments provide the P row electrodes and the M column electrodes with the first working voltage and the second working voltage by scanning the P row electrodes and the M column electrodes row by row.

It should be understood by those skilled in the art that, functions implemented by the units of the electronic device according to the embodiment of the present disclosure may be understood with reference to the correlated descriptions of the above information processing methods. Each of the units in the electronic device according to the embodiment of the present disclosure may be realized by an analog circuit for implementing the function according to the embodiment of the present disclosure, or by running software for executing the function according to the embodiment of the present disclosure on a smart terminal.

As an implementation, the touch-control unit includes P row electrodes and M column electrodes and the P row electrodes are intersected with the M column electrodes to form the N touch-control nodes, where P≥2 and M≥2;

the control unit controls to provide the touch-control unit with the second working voltage, if the first determination result indicates that the current working mode of the touch-control unit is the second working mode; wherein the frequency of the second working voltage is time-varying within the set threshold range and the second working voltage provides the P row electrodes and the M column electrodes with a working voltage in parallel;

correspondingly, the second acquisition unit 54 is further configured to acquire the variations of the first attribute value of the touch-control node within the touch region corresponding to the second touch operation on the touch-control unit under the different frequencies of the second working voltage; and the generation unit 55 is further configured to generate the first physiological characteristic information based on the variations of the first attribute value of the touch-control node within the touch region corresponding to the second touch operation on the touch-control unit under the different frequencies of the second working voltage.

Figure 6:
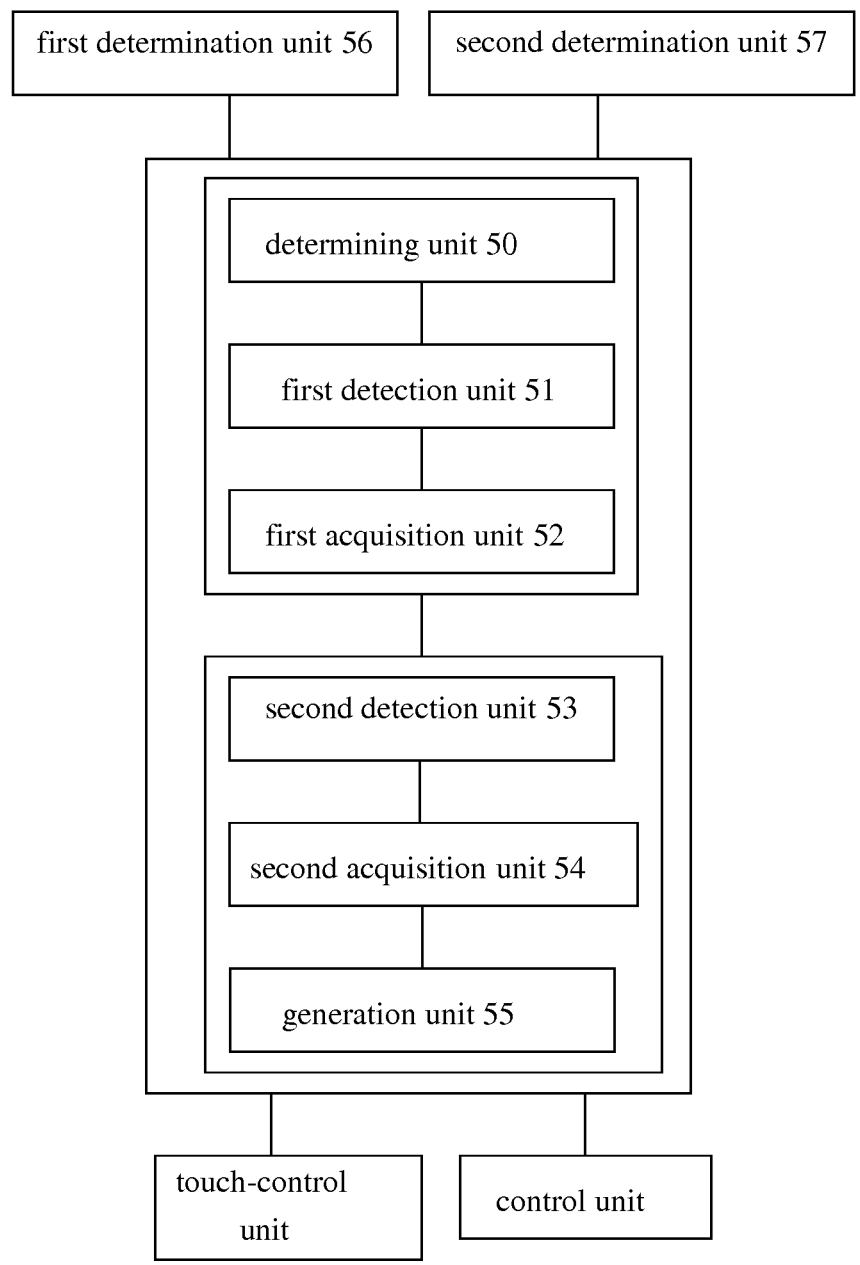
FIG. 6 is a schematic structural diagram of the composition of an electronic device according to a fifth embodiment of the present disclosure.

FIG. 6 is a schematic structural diagram of the composition of an electronic device according to a fifth embodiment of the present disclosure. As shown in FIG. 6, based on the electronic device shown in FIG. 5, the electronic device further includes a first determination unit 56 and a second determination unit 57. The first and second touch operations correspond to the same touch region on the touch-control unit; the touch-control unit includes P row electrodes and M column electrodes, the P row electrodes are intersected with the M column electrodes to form the N touch-control nodes, where P≥2 and M≥2; specifically, the first determination unit 56 is configured to set the touch region corresponding to the first touch operation as the touch region on the touch-control unit corresponding to the second touch operation;

the second determination unit 57 is configured to determine a row electrode and a column electrode which pass through the touch region corresponding to the second touch operation;

the control unit controls to provide the row electrode and the column electrode, which pass through the touch region corresponding to the second touch operation, with a third working voltage in parallel, and the frequency of the third working voltage is time-varying within a set threshold range;

correspondingly, the second acquisition unit 54 is further configured to acquire variations of a first attribute value of a touch-control node within a touch region corresponding to the second touch operations under different frequencies of the third voltage; and the generation unit 55 is further configured to generate first physiological characteristic information based on the variations of the first attribute value of the touch-control node within the touch region corresponding to the second touch operation under the different frequencies of the third working voltage.

The information processing method according to the embodiment is applied in an electronic device. The electronic device includes a touch-control unit capable of identifying first attribute information of a touch operation and a control unit for controlling the frequency of a working voltage of the touch-control unit. The touch-control unit includes P row electrodes and M column electrodes, and the P row electrodes intersect with the M column electrodes to form N touch-control node, where P≥2, N≥2 and M≥2. The first attribute information of the touch operation represents a variation of a first attribute value of a touch-control node within a touch region corresponding to the touch operation on the touch-control unit. In the embodiment of the present disclosure, the first attribute value represents the capacitance of the touch-control node.

The electronic device according to the embodiment of the present disclosure includes, but is not limited to, a mobile phone, a computer, a tablet computer, an electronic reader, a personal digital assistant, etc, as long as the electronic device includes a touch screen, with which a user can perform the touch operation on the electronic device. In the embodiment of the present disclosure, the touch-control unit of the electronic device is the touch screen and in general is a capacitive touch screen.

Figure 7:
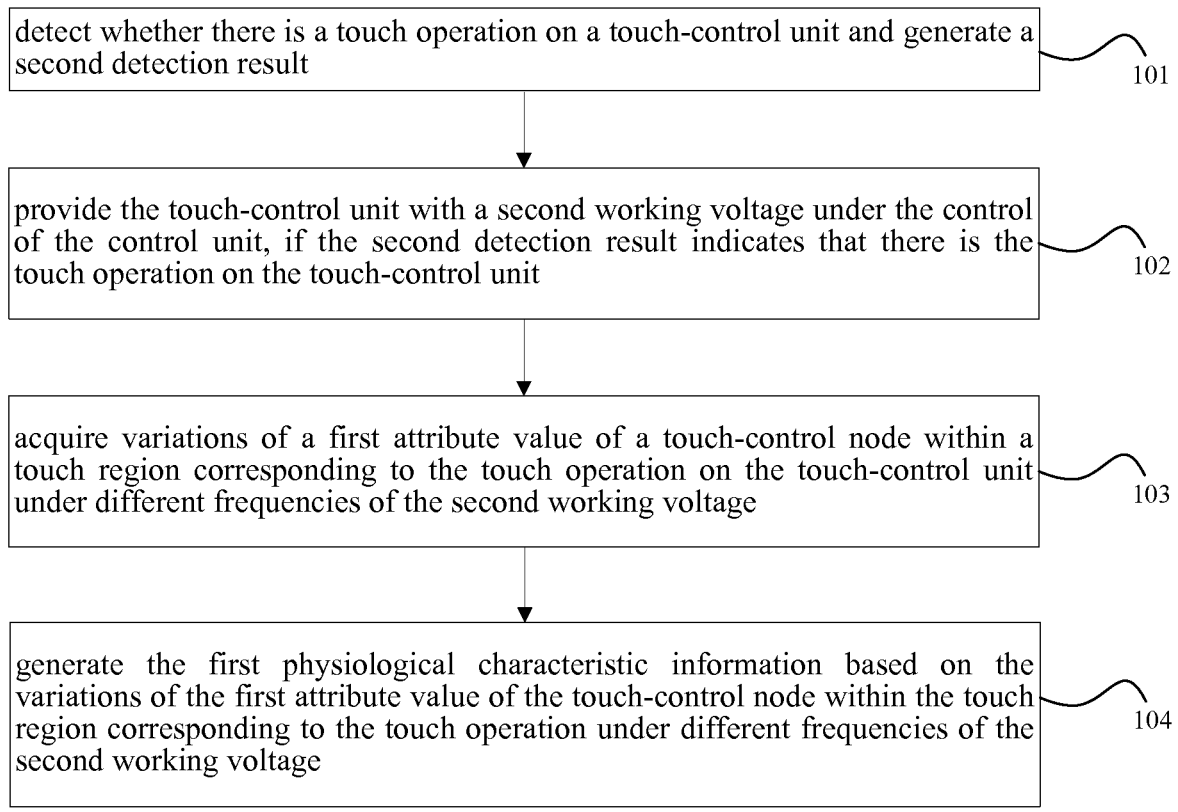
FIG. 7 is a flowchart of an information processing method according to a sixth embodiment of the present disclosure.

FIG. 7 is a flowchart of an information processing method according to a sixth embodiment of the present disclosure. As shown in FIG. 7, the information processing method in the example includes steps as follows.

In step 101, it is detected whether there is a touch operation on a touch-control unit and a second detection result is generated.

In the embodiment of the present disclosure, when starting a working mode of acquiring identity information of an operating user, an electronic device detects whether there is a touch operation on the touch-control unit performed by the user. If it is detected that there is the touch operation on the touch-control unit performed by the user, the electronic device may provide P row electrodes and M column electrodes with a voltage of a time-varying frequency in parallel, to detect variations of a capacitance value of a touch-control node within a touch region corresponding to a touch operation on the touch-control unit under different frequencies, and take the variations of the capacitance value as physiological characteristic information of the user performing the operation.

In step 102, the touch-control unit is provided with a second working voltage under the control of the control unit, if the second detection result indicates that there is the touch operation on the touch-control unit.

The frequency of the second working voltage is time-varying within a set threshold range with time, and the second working voltage provides the P row electrodes and the M column electrodes with a working voltage in parallel.

If it is detected that there is the touch operation on the touch-control unit, the control unit controls to provide the touch-control unit with the second working voltage. The frequency of the second working voltage is time-varying within the set threshold range, and the second working voltage provides the P row electrodes and the M column electrodes with a working voltage in parallel. In the embodiment of the present disclosure, the frequency of the second working voltage is time-varying within a range of 50 Hz to 1 MHz with a step of 50 Hz. The time-varying frequency may be 30000 Hz, and of course, may also be 25000 Hz. The time-varying frequency depends on the processing efficiency of the electronic device and a time-varying parameter supported by a voltage providing unit. The time-varying frequency, the range for frequency-changing and step for changing the frequency are not restricted in the embodiment of the present disclosure. It should be noted that, the smaller the step size is, the more accurate the detected physiological characteristic information of the user is, and the higher the requirement on a processing resource is.

In step 103, it is acquired variations of a first attribute value of a touch-control node within a touch region corresponding to the touch operation on the touch-control unit under different frequencies of the second working voltage.

In the embodiment of the present disclosure, it is acquired the variations of the capacitance value of the touch-control node within the touch region under different frequencies of the second working voltage. Assuming that the frequency of the second working voltage changes in the range of 50 Hz to 1 MHz with the step being 50 Hz, the embodiment of the present disclosure will detect the variations of capacitance value of the touch-control node within the touch region under 50 Hz, 100 Hz, 150 Hz, 200 Hz, . . . , until 1 MHz, establish a function correspondence between the different frequencies and the variations of the capacitance value of the touch-control node within the touch region and generate a curve of the variations of the capacitance value of the touch-control node within the touch region under the different frequencies, which is used as first physiological characteristic information of the user performing the touch operation.

In step 104, the first physiological characteristic information is generated based on the variations of the first attribute value of the touch-control node within the touch region corresponding to the touch operation under different frequencies of the second working voltage.

The function correspondence between the different frequencies and the variations of the capacitance value of the touch-control node within the touch region is established and the curve of the variations of the capacitance value of the touch-control node within the touch region under the different frequencies is generated as the first physiological characteristic information of the user performing the touch operation.

In the technical scheme according to the embodiment of the present disclosure, a correspondence of variations of a capacitance value of a touch-control node corresponding to a touch region under a voltage with different frequencies is detected and used as physiological characteristic information of a user, and the user is identified using the physiological characteristic information. Thereby, various operations on the touch-control unit operated by the user are expanded, and the technical schemes are implemented only by adding some control logics and corresponding frequency-variable voltages without a major modification in the original control structure of the electronic device. Therefore, the technical scheme is implemented with a low cost. For example, different users may operate the touch-control unit at the same time, after the different users are identified by the technical scheme according to the embodiment of the present disclosure, touch traces of the different users are marked with different colors, or, after the touch operations are detected as touch operations by the different users, the touch operations of the different users are responded to respectively. For example, in the case that more than two users respectively operate the touch-control unit, the electronic device identifies corresponding users and respectively responds to the touch operation of each user.

The information processing method according to the embodiment is applied in an electronic device. The electronic device includes a touch-control unit capable of identifying first attribute information of a touch operation and a control unit for controlling the frequency of a working voltage of the touch-control unit. The touch-control unit includes P row electrodes and M column electrodes, and the P row electrodes intersect with the M column electrodes to form N touch-control node, where P≥2, N≥2 and M≥2. The first attribute information of the touch operation represents a variation of a first attribute value of a touch-control node within a touch region corresponding to the touch operation on the touch-control unit. In the embodiment of the present disclosure, the first attribute value represents the capacitance of the touch-control node.

The electronic device according to the embodiment of the present disclosure includes, but is not limited to, a mobile phone, a computer, a tablet computer, a electronic reader, a personal digital assistant, etc, as long as the electronic device includes a touch screen, with which a user can perform the touch operation on the electronic device. In the embodiment of the present disclosure, the touch-control unit of the electronic device is the touch screen and in general is a capacitive touch screen.

Figure 8:
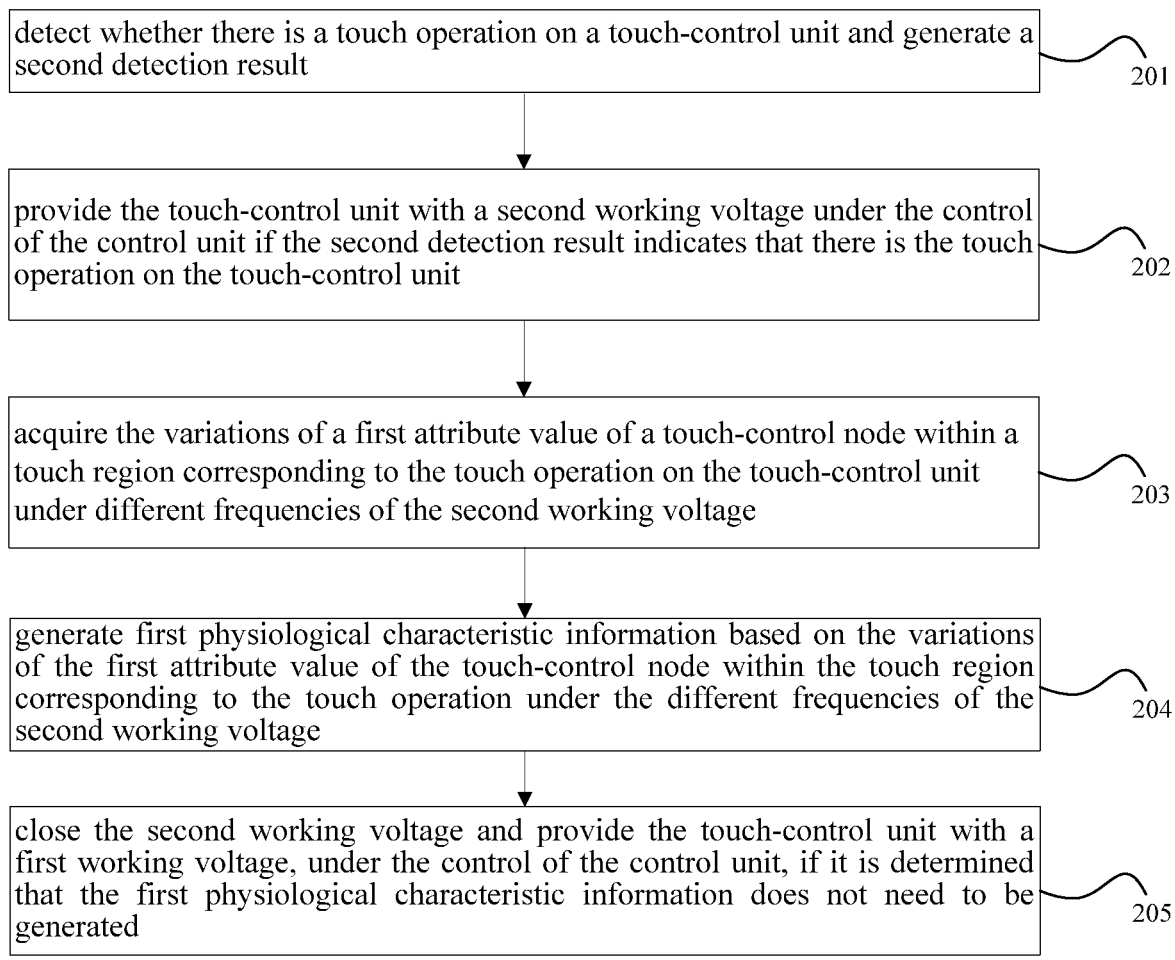
FIG. 8 is a flowchart of an information processing method according to a seventh embodiment of the present disclosure.

FIG. 8 is a flowchart of an information processing method according to a seventh embodiment of the present disclosure. As shown in FIG. 8, the information processing method according to the embodiment includes steps as follows.

In step 201, it is detected whether there is a touch operation on a touch-control unit and a second detection result is generated.

In the embodiment of the present disclosure, when starting a working mode of acquiring identity information of an operating user, the electronic device detects whether there is a touch operation on the touch-control unit performed by the user. If it is detected that there is the touch operation on the touch-control unit performed by the user, the electronic device provides P row electrodes and M column electrodes with a voltage with a time-varying frequency in parallel, to detect variations of a capacitance value of a touch-control node within a touch region corresponding to a touch operation on the touch-control unit under different frequencies and use it as physiological characteristic information of the user performing the touch operation.

In step 202, the touch-control unit is provided with a second working voltage under the control of the control unit if the second detection result indicates that there is the touch operation on the touch-control unit; the frequency of the second working voltage is time-varying within a set threshold range, and the second working voltage provides the P row electrodes and the M column electrodes with a working voltage in parallel.

The control unit controls to provide the touch-control unit with the second working voltage if it is detected that there is the touch operation on the touch-control unit. The frequency of the second working voltage is time-varying within a set threshold range, and the second working voltage provides the P row electrodes and the M column electrodes with the working voltage in parallel. In the embodiment of the present disclosure, the frequency of the second working voltage may vary within a range of 50 Hz to 1 MHz with time with a step of 50 Hz. The time-varying frequency of the time change may be 30000 Hz, and of course, may also be 25000 Hz. The time-varying frequency depends on the processing efficiency of the electronic device and a time-varying parameter supported by a voltage providing unit. The time-varying frequency, the range and step for the frequency-changing are not restricted in the embodiment of the present disclosure. It should be noted that, the smaller the step size is, the more accurate the detected physiological characteristic information of the user is, and the higher the requirement on a processing resource is.

In step 203, it is acquired the variations of a first attribute value of a touch-control node within a touch region corresponding to the touch operation on the touch-control unit under different frequencies of the second working voltage.

In the embodiment of the present disclosure, it is acquired the variations of a capacitance value of the touch-control node within the touch region under the different frequencies of the second working voltage. Assuming that the frequency of the second working voltage changes in the range of 50 Hz to 1 MHz with the step being 50 Hz, the embodiment of the present disclosure may detect the variations of a capacitance value of the touch-control node within the touch region under 50 Hz, 100 Hz, 150 Hz, 200 Hz, . . . , until 1 MHz, establish a function correspondence between the different frequencies and the variations of the capacitance value of the touch-control node within the touch region and generate a curve of the variations of the capacitance value of the touch-control node within the touch region under the different frequencies and use it as first physiological characteristic information of the user performing the touch operation.

In step 204, first physiological characteristic information is generated based on the variations of the first attribute value of the touch-control node within the touch region corresponding to the touch operation under the different frequencies of the second working voltage.

A function correspondence between the different frequencies and the variations of the capacitance value of the touch-control node within the touch region is established and a curve of the variations of the capacitance value of the touch-control node within the touch region under the different frequencies is generated and used as the first physiological characteristic information of the user performing the touch operation.

In step 205, the second working voltage is closed and the touch-control unit is provided with a first working voltage, under the control of the control unit, if it is determined that the first physiological characteristic information does not need to be generated.

The frequency of the first working voltage is a fixed value.

In the embodiment of the present disclosure, in the case that the electronic device does not need to start a mode of acquiring user physiological characteristic information, only a voltage with a fixed frequency needs to be provided to the touch-control unit, instead of the second working voltage with a time-varying frequency. In general, the frequency of the voltage of the touch-control unit of the electronic device is fixed. In the present disclosure, a voltage with the frequency in a range of 50 Hz to 120 Hz is provided to the touch-control unit.

Figure 9:
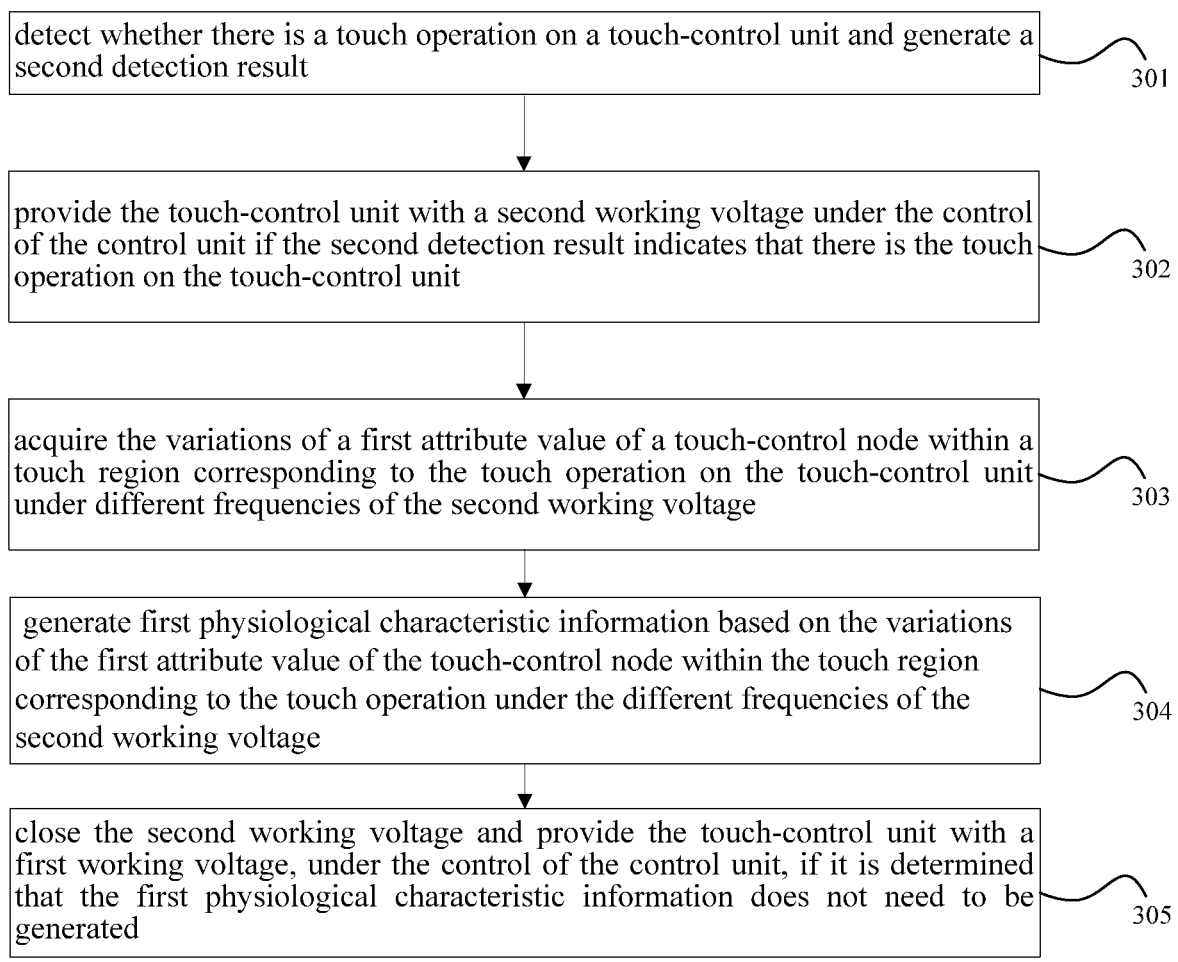
FIG. 9 is a flowchart of an information processing method according to an eighth embodiment of the present disclosure.

FIG. 9 is a flowchart of an information processing method according to an eighth embodiment of the present disclosure. As shown in FIG. 9, the information processing method according to the embodiment includes steps as follows.

In step 301, it is detected whether there is a touch operation on a touch-control unit and a second detection result is generated.

In the embodiment of the present disclosure, when starting a working mode of acquiring identity information of an operating user, the electronic device detects whether there is a touch operation on the touch-control unit performed by the user. If it is detected that there is the touch operation on the touch-control unit performed by the user, the electronic device provides P row electrodes and M column electrodes with a voltage of a time-varying frequency in parallel, to detect variations of a capacitance value of a touch-control node within touch regions corresponding to a touch operation on the touch-control unit under different frequencies and use it as physiological characteristic information of the user performing the touch operation.

In step 302, the touch-control unit is provided with a second working voltage under the control of the control unit if the second detection result indicates that there is the touch operation on the touch-control unit; the frequency of the second working voltage is time-varying within a set threshold range, and the second working voltage provides the P row electrodes and the M column electrodes with a working voltage in parallel.

The control unit controls to provide the touch-control unit with the second working voltage if it is detected that there is the touch operation by a user on the touch-control unit. The frequency of the second working voltage changes is time-varying within the set threshold range, and the second working voltage provides the P row electrodes and the M column electrodes with the working voltage in parallel. In the embodiment of the present disclosure, the frequency of the second working voltage may change within a range of 50 Hz to 1 MHz with time with a step of 50 Hz. The time-varying frequency of the time change may be 30000 Hz, and of course, may also be 25000 Hz. The time-varying frequency depends on the processing efficiency of the electronic device and a time-varying parameter supported by a voltage providing unit. The time-varying frequency, the range and step for the frequency-changing are not restricted in the embodiment of the present disclosure. It should be noted that, the smaller the step size is, the more accurate the detected physiological characteristic information of the user is, and the higher the requirement on a processing resource is.

In step 303, it is acquired the variations of a first attribute value of a touch-control node within a touch region corresponding to the touch operation on the touch-control unit under different frequencies of the second working voltage.

In the embodiment of the present disclosure, it is acquired the variations of a capacitance value of the touch-control node within the touch region under the different frequencies of the second working voltage. Assuming that the frequency of the second working voltage changes in the range of 50 Hz to 1 MHz with the step being 50 Hz, the embodiment of the present disclosure will detect the variations of the capacitance value of the touch-control node within the touch region under 50 Hz, 100 Hz, 150 Hz, 200 Hz, . . . , until 1 MHz, establish a function correspondence between the different frequencies and the variations of the capacitance value of the touch-control node within the touch region and generate a curve of the variations of the capacitance value of the touch-control node within the touch region under the different frequencies and use it as first physiological characteristic information of the user performing the touch operation.

In step 304, first physiological characteristic information is generated based on the variations of the first attribute value of the touch-control node within the touch region corresponding to the touch operation under the different frequencies of the second working voltage.

A function correspondence between the different frequencies and the variations of the capacitance value of the touch-control node within the touch region is built and a curve of the variations of the capacitance value of the touch-control node within the touch region under the different frequencies is generated and used as the first physiological characteristic information of the user performing the touch operation.

In step 305, the second working voltage is closed and the touch-control unit is provided with a first working voltage, under the control of the control unit, if it is determined that the first physiological characteristic information does not need to be generated.

The frequency of the first working voltage is a fixed value.

In the embodiment of the present disclosure, in the case that the electronic device does not need to start a mode of acquiring user physiological characteristic information, only a voltage with a fixed frequency needs to be provided to the touch-control unit, instead of the second working voltage with a time-varying frequency. In general, the frequency of the voltage of the touch-control unit of the electronic device is fixed. In the present disclosure, a voltage with the frequency in a range of 50 Hz to 120 Hz is provided to the touch-control unit.

As an implementation, to provide the voltage with the frequency in the range of 50 Hz to 120 Hz to the touch-control unit, the working voltage is provided to the P row electrodes and the M column electrodes in a scanning manner, instead of the parallel manner in the case of the first working voltage. The frequency of the scanning may be in a range of 5000 Hz to 30000 Hz, which depends on the processing capability of the electronic device.

In the technical scheme according to the embodiments of the present disclosure, a correspondence of variations of a capacitance value of a touch-control node corresponding to a touch region under a voltage with different frequencies is detected and used as physiological characteristic information of a user, and the user is identified with the physiological characteristic information. Thereby, various operations on the touch-control unit operated by the user are expanded, and the technical schemes are implemented only by adding some control logics and corresponding frequency-variable voltages without a major modification in the original control structure of the electronic device. Therefore, the technical scheme is implemented with a low cost. For example, different users may operate the touch-control unit at the same time, after the different users are identified by the technical scheme according to the embodiment of the present disclosure, touch traces of the different users are marked with different colors, or, after the touch operations are detected as touch operations by the different users, the touch operations of the different users are responded to. For example, in the case that more than two users respectively operate the touch-control unit, the electronic device identifies the users and respectively responds to the touch operations of the different users.

Figure 10:
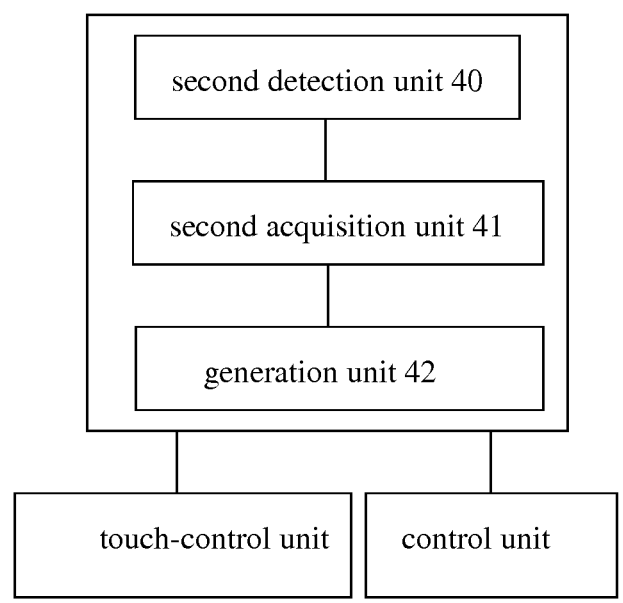
FIG. 10 is a schematic structural diagram of the composition of an electronic device according to a ninth embodiment of the present disclosure.

FIG. 10 is a schematic structural diagram of the composition of an electronic device according to a ninth embodiment of the present disclosure. As shown in FIG. 10, the electronic device includes a touch-control unit capable of identifying first attribute information of a touch operation and a control unit for controlling the frequency of a working voltage of the touch-control unit. The touch-control unit includes P row electrodes and M column electrodes, and the P row electrodes are intersected with the M column electrodes to form N touch-control node, where P≥2, N≥2 and M≥2. The first attribute information of the touch operation represents a variation of a first attribute value of a touch-control node within a touch region corresponding to the touch operation on the touch-control unit.

The electronic device according to the embodiment of the present disclosure includes, but is not limited to, a mobile phone, a computer, a tablet computer, a electronic reader, a personal digital assistant, etc, as long as the electronic device includes a touch screen, with which a user can perform the touch operation on the electronic device. In the embodiment of the present disclosure, the touch-control unit of the electronic device is the touch screen and in general is a capacitive touch screen.

The variation of the first attribute value of the touch-control node is a variation of a capacitance value of the touch-control node; and the first physiological characteristic information is a correspondence between different frequencies of the working voltage and the variations of the capacitance value of the touch-control node within the touch region corresponding to the touch operation under the different frequencies for an electronic device user.

As shown in FIG. 10, the electronic device according to the embodiment of the present disclosure further includes a second detection unit 40, a second acquisition unit 41 and a generation unit 42.

The second detection unit 40 is for detecting whether there is a touch operation on the touch-control unit and generating a second detection result.

The control unit controls to provide the touch-control unit with a second working voltage if the second detection result indicates that there is the touch operation on the touch-control unit; the frequency of the second working voltage is time-varying in a set threshold range and the second working voltage provides the P row electrodes and the M column electrodes with a working voltage in parallel.

In the embodiment of the present disclosure, the frequency of the second working voltage is time-varying within a range of 50 Hz to 1 MHz with a step of 50 Hz. The frequency of the time change may be 30000 Hz, and of course, may also be 25000 Hz. The time-varying frequency depends on the processing efficiency of the electronic device and a time-varying parameter supported by a voltage providing unit. The time-varying frequency, the range and step for the time-varying frequency are not restricted in the embodiment of the present disclosure. It should be noted that, the smaller the step size is, the more accurate the detected physiological characteristic information of the user is, and the higher the requirement on a processing resource is.

The second acquisition unit 41 is for acquiring variations of a first attribute value of a touch-control node within a touch region corresponding to the touch operation on the touch-control unit under different frequencies of the second working voltage.

The generation unit 42 is for generating first physiological characteristic information based on the variations of the first attribute value of the touch-control node within the touch region corresponding to the touch operation on the touch-control unit under the different frequencies of the second working voltage.

It should be understood by those skilled in the art that, functions implemented by processing units of the electronic device according to the embodiment of the present disclosure may be understood with reference to the correlated descriptions of the above information processing methods. Each of the processing units in the electronic device according to the embodiment of the present disclosure may be realized by an analog circuit for implementing the function according to the embodiment of the present disclosure, or by running software for executing the function according to the embodiment of the present disclosure on a smart device.

Figure 11:
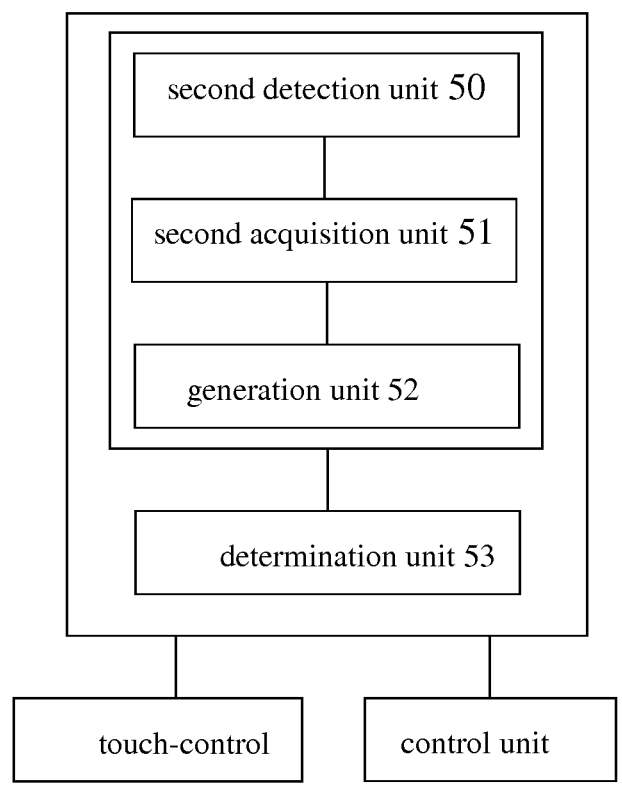
FIG. 11 is a schematic structural diagram of the composition of an electronic device according to a tenth embodiment of the present disclosure.

FIG. 11 is a schematic structural diagram of the composition of an electronic device according to a tenth embodiment of the present disclosure. As shown in FIG. 11, the electronic device includes a touch-control unit capable of identifying first attribute information of a touch operation and a control unit for controlling the frequency of a working voltage of the touch-control unit. The touch-control unit includes P row electrodes and M column electrodes, and the P row electrodes are intersected with the M column electrodes to form N touch-control node, where P≥2, N≥2 and M≥2. The first attribute information of the touch operation represents a variation of a first attribute value of a touch-control node within a touch region corresponding to the touch operation on the touch-control unit.

The electronic device according to the embodiment of the present disclosure includes, but is not limited to, a mobile phone, a computer, a tablet computer, a electronic reader, a personal digital assistant, etc, as long as the electronic device includes a touch screen, with which a user can perform the touch operation on the electronic device. In the embodiment of the present disclosure, the touch-control unit of the electronic device is the touch screen and in general is a capacitive touch screen.

The variation of the first attribute value of the touch-control node is a variation of a capacitance value of the touch-control node; and the first physiological characteristic information is a correspondence between different frequencies of the working voltage and variations of the capacitance value of the touch-control node within the touch region corresponding to the touch operation under the different frequencies for an electronic device user.

As shown in FIG. 11, the electronic device according to the embodiment of the present disclosure further includes: the second detection unit 50, the second acquisition unit 51, the generation unit 52 and the determination unit 53.

The second detection unit 50 is for detecting whether there is a touch operation on the touch-control unit and generating a second detection unit.

The control unit controls to provide the touch-control unit with the second working voltage if the second detection result indicates that there is the touch operation on the touch-control unit. The frequency of the second working voltage is time-varying within a set threshold range, and the second working voltage provides the P row electrodes and the M column electrodes with a working voltage.

The second acquisition unit 51 is for acquiring the variations of the first attribute value of the touch-control node within the touch region corresponding to the touch operation on the touch-control unit under different frequencies of the second working voltage.

The generation 52 is for generating the first physiological characteristic information based on the variations of the first attribute value of the touch-control node within the touch region corresponding to the touch operation on the touch-control unit under the different frequencies of the second working voltage.

The determination unit 53 is for triggering the control unit to close the second working voltage and provide the first working voltage to the touch-control unit with the frequency of the first working voltage being a fixed value, if it is determined that the first physiological characteristic information does not need to be generated currently.

In the embodiment of the present disclosure, in the case that the electronic device does not need to start a mode of acquiring user physiological characteristic information, only a voltage with a fixed frequency needs to be provided to the touch-control unit, instead of the second working voltage with a time-varying frequency. In general, the frequency of the voltage of the touch-control unit of the electronic device is fixed. In the present disclosure, a voltage with a fixed frequency in a range of 50 Hz to 120 Hz is provided to the touch-control unit.

In the embodiment of the present disclosure, the second working voltage provides the P row electrodes and M column electrodes with the second working voltage by scanning the P row electrodes and the M column electrodes row by row. The frequency of the scanning may be in a range of 5000 Hz to 30000 Hz, which is specifically set based on the processing capability of the electronic device.

It should be understood by those skilled in the art that, functions implemented by the units of the electronic device according to the embodiment of the present disclosure may be understood with reference to the correlated descriptions of the above information processing methods. Each of the units in the electronic device according to the embodiment of the present disclosure may be realized by an analog circuit for implementing the function according to the embodiment of the present disclosure, or by running software for executing the function according to the embodiment of the present disclosure on a smart terminal.

The technical schemes according to the embodiments of the present disclosure may be combined in any way in the case that there is no conflict between the technical schemes.

In the several embodiments according to the present disclosure, it should be understood that, the disclosed methods and smart devices may be implemented in other ways and the embodiments of device described above are only schematic. For example, the units are divided only by logical functions, and may be divided by other ways in practical. For example, multiple units or components may be combined or integrated to another system, or some features may be omitted or not executed. In addition, as to the coupling for the displayed or discussed parts, direct coupling or communication connection to each other may be implemented through some interfaces, indirect couplings or communication connections may be electrical, mechanical or in other forms.

In the above, a unit described as a separate component may be or not be physically separated. The component displayed as a unit may be or not be a physical unit, that is, the component may be either located at one place or distributed to multiple network units. And the object of the technical schemes according to the embodiments may be implemented by selecting part of or all of the above units as needed.

Moreover, function units according to the embodiments of the present disclosure may be all integrated in one processing unit, or each of the function units may be an independent unit, or two or more of the function units may be integrated in one unit. The above integrated units may be implemented in a hardware form or a form of hardware plus software function unit.

The above are only specific embodiments of the present disclosure, but not intend to limit the scope of protection of the present disclosure. Changes or alternatives conceived by any skilled in the art within the technical scope disclosed by the present disclosure should fall within the scope of protection of the present disclosure.

The invention claimed is:

1. An information processing method, applied to a touch-control unit, wherein the touch-control unit comprises N touch-control nodes, N≥2 and the touch-control unit is operable in a first working mode or a second working mode, the method comprising:
    in response to the touch-control unit being in the first working mode:
        providing the touch-control unit with a first working voltage via a first excitation signal generator, wherein the first working voltage has a frequency which is a fixed value; and
    in response to the touch-control unit being in the second working mode:
        providing the touch-control unit with a second working voltage by disabling the first excitation signal generator and enabling a second excitation signal generator, wherein the second working voltage has a frequency which is time-varying within a preset threshold range;
        acquiring a variation of a capacitance value of a touch-control node within a touch region corresponding to a touch operation under a plurality of frequencies of the second working voltage, where the plurality of frequencies of the second working voltage comprise at least a first, second and third frequencies, and a difference between the first and second frequencies is the same as a difference between the second and third frequencies and is equal to 50 Hz; and
        based on the variation of the capacitance value, generating first physiological characteristic information for identifying the identity of a user.

2. The method according to claim 1, wherein the touch operation is a second touch operation, and the method further comprises:
    in response to the touch-control unit being in the first working mode:
    detecting a first touch operation associated with the touch-control unit;
    acquiring first attribute information of the first touch operation; and
    determining a touch region corresponding to the first touch operation according to the first attribute information.

3. The method according to claim 2, wherein the first and second touch operations correspond to the same touch region on the touch-control unit; the touch-control unit comprises P row electrodes and M column electrodes, the P row electrodes are intersected with the M column electrodes to form the N touch-control nodes, where P≥2 and M≥2; the method further comprises:
    setting the touch region corresponding to the first touch operation as the touch region corresponding to the second touch operation;
    determining a row electrode and a column electrode of the touch region corresponding to the second touch operation; and
    providing the row electrode and the column electrode of the touch region corresponding to the second touch operation with a third working voltage in parallel, wherein frequency of the third working voltage is time-varying within a preset threshold range.

4. The method according to claim 2, wherein the first physiological characteristic information is a correspondence between different frequencies of the second working voltage and the variation of the capacitance value of the touch-control node within the touch region corresponding to the touch operation under the different frequencies.

5. The method according to claim 2, wherein the touch-control unit comprises P row electrodes and M column electrodes, P≥2 and M≥2, the N touch-control nodes are formed by intersecting the P row electrodes with the M column electrodes, wherein the second working voltage provides the P row electrodes and the M column electrodes with working voltage in parallel.

6. The method according to claim 1, wherein the touch-control unit comprises P row electrodes and M column electrodes, where P≥2 and M≥2, the method further comprises:
    providing the P row electrodes and the M column electrodes with the first and second working voltages by progressively scanning the P row electrodes and the M column electrodes.

7. An electronic device, comprising:
    a touch-control unit comprising N touch-control nodes, wherein N≥2 and the touch-control unit is operable in a first working mode or a second working mode;
    a memory storing instructions; and
    a processor in communication with the memory, wherein, when the processor executes the instructions, the processor is configured to cause the electronic device to:
    in response to the touch-control unit being in the first working mode:
        provide the touch-control unit with a first working voltage via a first excitation signal generator, wherein the first working voltage has a frequency which is a fixed value;
    in response to the touch-control unit being in the second working mode:
        provide the touch-control unit with a second working voltage by disabling the first excitation signal generator and enabling a second excitation signal generator, wherein the second working voltage has a frequency which is time-varying within a preset threshold range;

acquire a variation of a capacitance value of a touch-control node within a touch region corresponding to a touch operation on the touch-control unit under a plurality of frequencies of the second working voltage, where the plurality of frequencies of the second working voltage comprise at least a first, second and third frequencies, and a difference between the first and second frequencies is the same as a difference between the second and third frequencies and is equal to 50 Hz; and generate first physiological characteristic information for identifying the identity of a user, based on the variation of the capacitance value.

8. The electronic device according to claim 7, wherein the touch operation is a second touch operation and when the processor executes the instructions, the processor is configured to cause the electronic device to:

detect a first touch operation associated with the touch-control unit, in response to the touch-control unit being in the first working mode;

detect a touch operation of a user if the touch-control unit is in the second working mode, wherein the touch operation is associated with the touch-control unit; and acquire first attribute information of the first touch operation and determine a touch region corresponding to the first touch operation based on the first attribute information.

9. The electronic device according to claim 8, wherein the first and second touch operations correspond to the same touch region on the touch-control unit; the touch-control unit comprises P row electrodes and M column electrodes, the P row electrodes are intersected with the M column electrodes to form the N touch-control nodes, where $P \geq 2$ and $M \geq 2$; and, when the processor executes the instructions, the processor is configured to cause the electronic device to:

determine the touch region corresponding to the first touch operation as the touch region corresponding to the second touch operation;

determine a row electrode and a column electrode of the touch region corresponding to the second touch operation; and provide the row electrode and the column electrode of the touch region corresponding to the second touch operation with a third working voltage in parallel, wherein frequency of the third working voltage is time-varying within a preset threshold range.

10. The electronic device according to claim 8, wherein the touch-control unit comprises P row electrodes and M column electrodes, where $P \geq 2$ and $M \geq 2$; and when the processor executes the instructions, the processor is configured to cause the electronic device to:

control the first and second working voltages to provide the P row electrodes and the M column electrodes with working voltages by progressively scanning the P row electrodes and the M column electrodes.

11. The electronic device according to claim 8, wherein:

the first physiological characteristic information is a correspondence between different frequencies of the second working voltage and the variation of the capacitance value of the touch-control node within the touch region corresponding to the touch operation under the different frequencies.

12. The electronic device according to claim 8, wherein:

the touch-control unit comprises P row electrodes and M column electrodes, and the P row electrodes are intersected with the M column electrodes to form the N touch-control nodes, where $P \geq 2$ and $M \geq 2$; and the second working voltage provides the P row electrodes and the M column electrodes with a working voltage in parallel.

* * * * *